United States Patent [19]

Hopkins

[11] 3,986,701
[45] Oct. 19, 1976

[54] SPADE-LIKE DETENT FOR HYDRAULIC CONTROL VALVE
[75] Inventor: Donald L. Hopkins, Joliet, Ill.
[73] Assignee: Caterpillar Tractor Co., Peoria, Ill.
[22] Filed: Jan. 6, 1975
[21] Appl. No.: 539,204

[52] U.S. Cl.................................. 251/297; 292/74; 74/527
[51] Int. Cl.²........................................ F16K 35/04
[58] Field of Search............... 251/90, 92, 297, 337; 137/543.13; 74/503, 527; 292/16, 74, 277

[56] References Cited
UNITED STATES PATENTS

| 308,887 | 12/1884 | Forg | 292/74 |
|---|---|---|---|
| 375,200 | 12/1887 | Ross et al. | 74/527 |
| 1,686,805 | 10/1928 | Forg | 292/74 |
| 2,182,546 | 12/1939 | Raymond | 292/16 |
| 2,348,292 | 5/1944 | Gross | 74/527 |
| 2,371,657 | 3/1945 | Stark | 251/297 |
| 2,379,995 | 7/1945 | Shaw | 251/337 |
| 2,535,981 | 12/1950 | Bernhard | 292/277 |
| 2,910,267 | 10/1959 | Holby | 251/297 |
| 3,285,284 | 11/1966 | Junck et al. | 137/624.27 |

FOREIGN PATENTS OR APPLICATIONS

| 532,135 | 10/1954 | Belgium | 251/297 |
|---|---|---|---|
| 10,956 | 6/1908 | Denmark | 292/74 |
| 375,274 | 6/1907 | France | 292/74 |

*Primary Examiner*—William R. Cline
*Assistant Examiner*—H. Jay Spiegel
*Attorney, Agent, or Firm*—Phillips, Moore, Weissenberger, Lempio & Strabala

[57] ABSTRACT

A detent mechanism for a reciprocably mounted valve spool includes a plunger mounted in a housing surrounding an end of said spool and including guide means for the plunger at its forward end and its rearward end to provide guide support of the plunger as it is biased into engagement with detent grooves formed on the valve spool. The detent assembly includes an assembly of parts including biasing means and guide means retained in their operative relationship with the plunger for ready insertion or removal from the housing.

5 Claims, 1 Drawing Figure

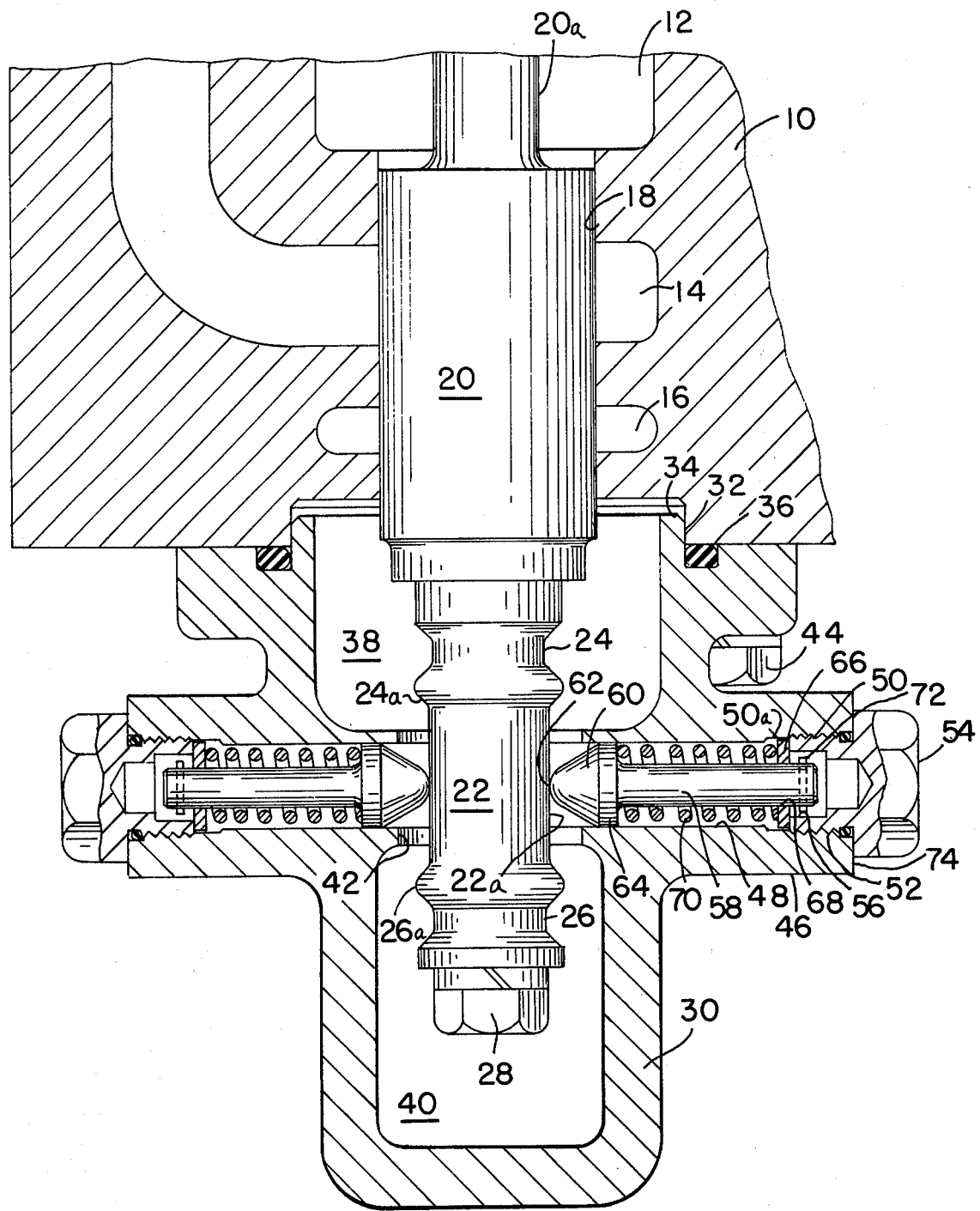

SPADE-LIKE DETENT FOR HYDRAULIC CONTROL VALVE

BACKGROUND OF THE INVENTION

The present invention relates to detent mechanisms and pertains particularly to pre-assembled detent mechanisms for retaining hydraulic valve spools in preselected positions.

Detent mechanisms for holding valve spools in preselected positions are well known in the art. Such detent mechanisms normally consist of a plurality of elements which are separately and individually assembled in a bore in the valve housing extending transversely to the valve spool. Such assemblies normally have numerous disadvantages. For example, when it is desired to remove the valve spool it is necessary to disassemble the detent mechanism, otherwise the detent plunger and spring will be forced into the valve bore. It will also be appreciated since the parts of the detent mechanism are not pre-assembled, the assembly will be cumbersome and time-consuming because each separate part must be handled separately and inserted in proper sequence. It will also be appreciated if such parts may also be lost or misplaced during the assembly or disassembly of the mechanism.

While pre-assembled detent mechanisms are known, such mechanisms are encased in capsule-like fashion in a housing. Such assemblies have the disadvantage of requiring considerable space to accommodate the extra housing and retaining means. Attempts to reduce the space required for such assembly normally provide a mechanism which fails to include sufficient guide means for the detent plunger. Consequently, side loading imposed on the plunger by attempted movement of the spool tends to cocking or tilting of the plunger, causing it to bind or hang up in the bore and causing considerable force to be required to move the valve spool. The binding of such mechanisms also tends to vary, resulting in differences in operator feel and consequent inconsistent control of the hydraulic control valve.

The prior art is exemplified by the following U.S. Pat. Nos.: 2,984,258 issued May 16, 1961 to Clary; 3,285,284 issued Nov. 15, 1966 to Junck et al.; and 3,339,584 issued Sept. 5, 1967 to Long.

SUMMARY AND OBJECTS OF THE INVENTION

It is a primary object of the present invention to provide a detent mechanism that overcomes the above problems of the prior art.

Another object of the present invention is to provide a pre-assembled detent mechanism that is compact and uniformly functional.

A further object of the present invention is to provide a pre-assembled detent assembly that is compact in structure and includes sufficient guide means to prevent binding of the detent mechanism.

In accordance with the primary aspect of the present invention, a detent mechanism includes an assembly of parts retained in an operative position without the use of a housing and includes guide means sufficiently spaced along the plunger to prevent binding of the detent plunger.

BRIEF DESCRIPTION OF THE DRAWING

The above and other objects and advantages of the present invention will become apparent from the following specification when read in conjunction with the drawings, wherein the single FIGURE is a schematic layout of a detent mechanism in accordance with the present invention.

DETAILED DESCRIPTION OF THE PREFERRED EMBODIMENT

Referring now to the drawing, there is illustrated a detent mechanism in accordance with the present invention in combination with a valve spool. A valve assembly comprising a housing 10 is provided with a plurality of fluid passages 12, 14 and 16 which intersect and communicate with a cylindrical bore 18. A valve spool 20 is reciprocably mounted within the bore 18 and includes the usual grooves, or the like, 20a for controlling communication between various ones of the fluid passages. The valve spool 20 includes an extension 22 which is preferably a cylindrical portion and includes a plurality of grooves 24 and 26 which define a portion of the detent mechanism to be described. This extension 22 may be formed integral with the spool 20 or may be an attachment secured thereto such as by a suitable bolt 28.

A detent assembly comprising a housing 3 includes a cylindrical extension thereof 32 which extends or fits within a pilot bore 34 of housing 10. This pilot bore 34 is concentric with bore 18 for proper alignment of the housing 30 with the spool 20. Suitable seal means such as an O-ring 36 provides a seal between the two housings to prevent the escape of fluid therefrom. The housing 30 includes a pair of cavities 38 and 40 connected by a bore 42 also receiving the extension 22 of the valve spool 20. The housing 30 is detachably secured to the valve housing 10 by suitable means such as a plurality of bolts 44. This arrangement, with a detachable extension 22, permits the present assembly to be attached to practically any spool valve system not previously having a detent mechanism. This can be accomplished simply by preparing a conventional spool with means for attachment of the extension 22 and preparing the housing for attachment of the detent housing 30.

The detent housing 30 is provided with a plurality of opposed bosses 46, each of which includes a bore 48 having outer threaded portions 50 for receiving threaded extensions 52 of a cap 54. The cap 54 includes a recess 56 for receiving the end of a detent plunger, to be described.

The detent mechanism includes a pre-assembled portion that includes the operative portions of the mechanisms pre-assembled to be inserted as a unit into the bore 48. The assembly includes a plunger having an elongated shank 58 extending outward from a head 60 of substantially conical shape having a forward substantially spherical-shaped nose 62 which engages and fits into grooves 24 and 26 of extension 22. The plunger further includes first annular guide means comprising a cylindrical bearing surface 64 which engages the cylindrical bore 48 for guiding the plunger smoothly along the axis of the bore 48. The outer end of shank 58 opposite the head 60 is supported in suitable guide means in the form of an annular member or washer 66 which fits within the bore 50 which is slightly larger than bore 48 thereby defining a shoulder 50a which is operative to prevent the assembly from falling into the central bore or chamber of housing 30. The guide means or washer 66 includes a central bore 68 for receiving and supporting the outer end of the shank 58.

The shank 58 receives a coiled compression spring 70 which may be compressed as required and retained between the plunger head 60 and the guide means or member 66. This spring comprises suitable means for biasing the plunger into engagement with the grooves 24 and 26. A retaining pin 72 extends through the outer end of shank 58 for retaining member 66 and spring 70 on the shank 58 and thus provides a pre-assembled detent assembly which fits within the bore 48.

It will be seen that this assembly can be preassembled by placing spring 70 and washer member 66 on shank 58 and placing retaining pin 72 in place, thus the operative portion of the assembly is retained in place such that merely dropping the assembly within the bore 48 and placing cap 54 within the bore 50 completes the assembly. Similarly, the assembly may be removed simply by removing cap 54 and letting the assembly fall out intact. It will also be noted that the assembly cannot fall further into the bore 48 than shoulder 50a permits.

The detent assemblies are preferably mounted in opposed pairs to maintain an even force transverse to the axis of the spool 20 so as to avoid the imposition of misalignment or transverse forces thereon that may tend to cause the spool to bind. The force imposed on the detent plungers is determined for a given set of assemblies by the distance that the assembly is pressed into the bore by the cap member 54. This distance is determined by the radial distance of the end surface 74 of boss 46. This distance is established from the center axis of spool 20 and extension 22 thereof by establishing a distance thereof from a suitable datum line such as the cylindrical surface 32.

The construction of extension 22 also provides an advantage which gives the operator the feel of the shifting of the spool 20. This is accomplished by providing a cylindrical surface of the spool 22a which is substantially the same diameter of the bottom of the grooves 24 and 26 so that the detent plungers must ride over ridges 24a and 26a before entering the grooves 24 and 26. This gives the operator a feel of where the detent grooves are and the end of the stroke of the spool, and it gives the operator a feel of the force necessary to move the spool to the detent position. Additionally, a consistent feel of the system is established by virtue of the substantially uniform force applied by the plunger 60 and by the fact that the plungers are guided in a manner to prevent binding and thus provides a substantially consistent force of movement thereof for long periods of time.

It will, thus, be appreciated from the above description that there is provided a pre-assembled, compact and efficient detent assembly that may be readily adaptable to numerous applications such as valve spools. The detent mechanism is readily adjustable to give a desired detent action and provide a substantially consistent force operation over an extended period of time.

What is claimed is:

1. A detent assembly for engaging a cylindrical member reciprocably mounted in a bore in a housing for retaining said member in a predetermined position, said detent assembly comprising:
    a detent housing having a cavity for receiving one end of a reciprocably mounted cylindrical member;
    a reciprocably mounted cylindrical member having one end extending into said cavity and including an annular groove formed in said one end;
    a bore formed in said detent housing and extending transverse to the axis of and outward from said cylindrical member and including an open outer end and an outwardly facing annular shoulder formed near said outer end providing a larger diameter bore on the outer end of said detent housing and a smaller bore on the inner end of said detent housing;
    removable closure means for closing the outer end of said bore;
    a plunger having a head at one end extending toward said cylindrical member for engagement with said groove, and an elongated shank extending away from said head mounted in said bore;
    said head including first annular guide means engaging said smaller bore for guiding said plunger at said head end;
    second annular guide means comprising a washer of larger diameter than said smaller bore removably and reciprocably mounted in said bore between said annular shoulder and said closure means for engaging said shank and guiding the shank end of said plunger;
    biasing means comprising a coiled compression spring mounted on said shank and compressed between said washer and said head of said plunger for biasing said plunger toward said cylindrical member; and
    retaining means carried by the outer end of said plunger for retaining said washer and said spring on said shank for removal as a unitary assembly from said bore upon removal of said closure member from the outer end of said bore.

2. The detent assembly of claim 1 wherein said reciprocably mounted cylindrical member is an extension of a valve spool and includes a pair of spaced-apart grooves for receiving said plunger head.

3. The detent assembly of claim 2 wherein said cylindrical member includes an annular ridge defining a portion of each of said grooves so that the head of said plunger must ride over said ridge to enter said groove.

4. The detent assembly of claim 1 wherein said detent housing includes a plurality of said bores disposed in opposed relation and a plunger mounted in each of said bores.

5. The detent assembly of claim 1 wherein said cylindrical member is detachably secured to the end of a valve spool.

* * * * *